2 Sheets—Sheet 1.
S. S. NEWTON.
Oil-Can.
No. 223,377. Patented Jan. 6, 1880.
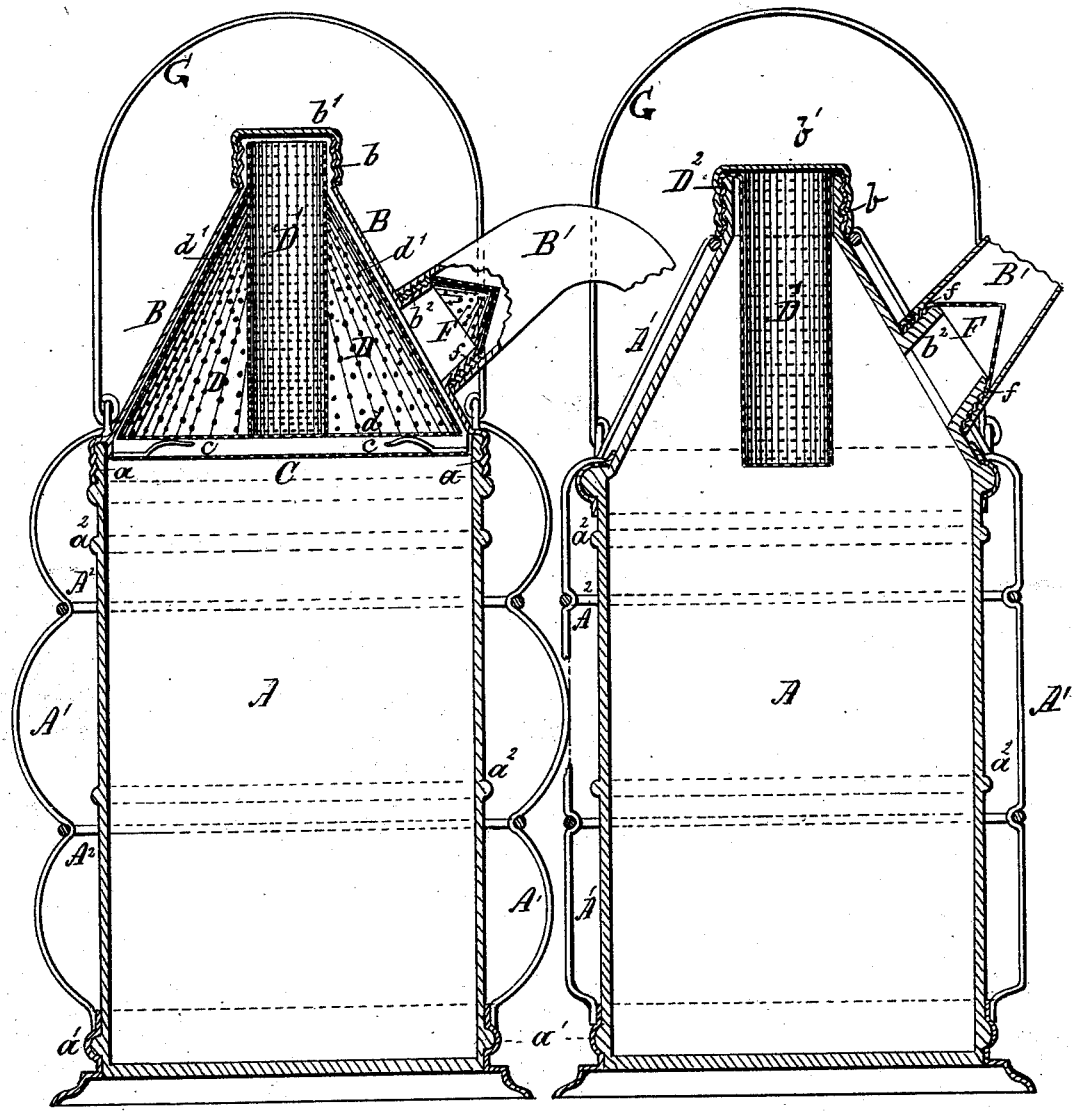

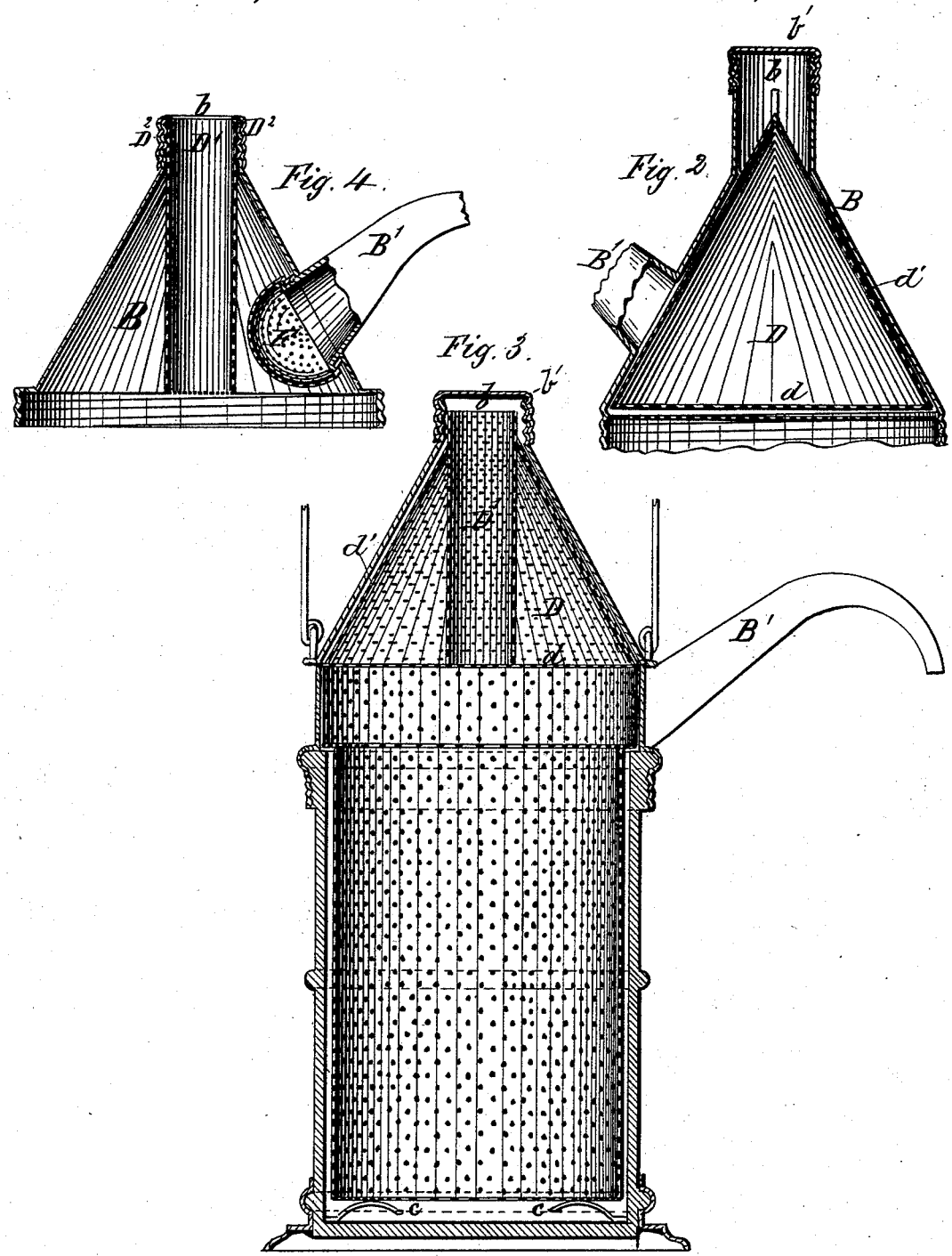

UNITED STATES PATENT OFFICE.

STEPHEN S. NEWTON, OF BINGHAMTON, NEW YORK.

OIL-CAN.

SPECIFICATION forming part of Letters Patent No. 223,377, dated January 6, 1880.

Application filed August 8, 1879.

*To all whom it may concern:*

Be it known that I, STEPHEN S. NEWTON, of Binghamton, in the county of Broome and State of New York, have invented certain new and useful Improvements in Oil-Cans; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to improvements in the manufacture of vessels employed to hold inflammable oils, which improvements will be fully hereinafter set forth.

Figure 1 is a vertical section of my improved oil-can. Fig. 2 is a vertical section (detached) of a modification of the upper conical part of the can. Fig. 3 is a vertical section of a modification of the can. Fig. 4 is a vertical section of another modification of the upper conical part of the can; and Fig. 5 is a vertical section of another modification, showing a portion of the invention with the body of the can formed in one piece.

The body of the can or vessel is represented by A. This is formed of glass by blowing or molding. It is provided with a screw-thread around its upper edge, as shown at $a$, whereby a metallic cap, B, is secured to the body, the whole forming, when joined together, a vessel of substantially the same conformation as an ordinary oil-can.

In order to protect the glass from accidental breakage, I attach to the vessel A, near the bottom, a metallic base, $a'$, upon which it rests, and also place around the vessel a series of wires, A' A' A². Some of these wires extend vertically from the upper metallic cap to the metal base; others run around body, and are attached to the vertical wires at intersecting points.

By making the vessel thus of glass the operator is enabled to readily examine the interior at any time when desirous of noting the quantity or condition of the contents.

Moreover, the glass body is blown or otherwise provided with a series of marks, recesses, or figures to indicate the amount of liquid in the vessel, as shown at $a^2\ a^2\ a^2$.

The metallic top B may be secured to the body A by cement or in any of the various methods employed in joining glass and metals.

C represents a diaphragm placed across the can, and it is made of wire-gauze or perforated sheet metal, or of any of the materials used to prevent the transmission of flame.

D represents the safety device, situated in the top B of the can. It is made of wire-gauze or perforated metal, and is constructed with a flat bottom, $d$, and a top, $d'$, corresponding in shape to the part B, so as to be adapted to fit tightly against the inner side of said part B.

D' is a central vertical cylindrical guard, also formed of gauze or perforated metal, open at the top and extending to the bottom $d$ of the safety device.

The top part, B, of the vessel is provided with the usual screw-threaded neck $b$, cap $b'$, and nozzle B'.

The nozzle may be secured in the ordinary way, or it may be provided with screw-threads at its inner end engaging with a screw-threaded collar, $b^2$.

F represents a gauze diaphragm or cone inserted within the nozzle and permanently secured thereto, or preferably held by means of a screw-collar, $f$, so that it can be removed, if desired.

$c\ c$ represent springs adapted to bear against the gauze safety device D, and hold it tightly against the inner end of nozzle B', and against the inner side of part B, so as not to allow any passage-way for flame between the parts B and D.

The vessel is filled by pouring the oil into the central chamber, D', the gauze wall of which prevents the entrance of any flame to the body of the safety device. When the oil is being poured from the can it passes through the diaphragm C, the gauze D, and nozzle B'.

Owing to the presence of foreign material in the oil, there is danger that the gauze will be clogged by it after some time.

The construction shown enables me to readily overcome the difficulty thus experienced, for it will be seen that as the safety device D is not rigidly attached, it can be rotated within the vessel, and that a clean place can be brought to the end of the nozzle when necessary.

G represents a handle attached to the can immediately above the glass part, it being hinged to the wire guards or to the metallic part inclosing the can.

I do not wish to limit myself to the exact construction shown, as the essential features of my invention may be retained without using all of those described. Thus the springs $c\ c$ may be dispensed with, as shown in Fig. 2, and the weight of the safety device and the pressure of the liquid may be depended upon to hold the gauze against the top and the nozzle; or they may be placed in the bottom of the vessel, as shown in Fig. 3, and a safety device may be used which fills the whole inside of the can.

The central gauze-chamber, $D'$, if it be tightly secured to the top of the can, will of itself prevent the passage of flame through the filling-orifice without requiring the conical part $d'$. It may be thus secured by attaching to it a screw-threaded collar, $D^2$, adapted to engage with the threads usually formed on the inside of oil-can necks, as shown in Fig. 4.

When the meshes or perforations become clogged the part $D'$ may be detached from the can and be cleansed; or, again, the conical part D may be alone relied upon, and the central part, $D'$, may be dispensed with, as shown in Fig. 2. When the conical part D is dispensed with the gauze F may be located on the inside of the can, as shown in Fig. 4.

I sometimes form the whole of the vessel of glass, as shown in Fig. 5, having a nozzle part and a filling part blown or molded with it.

It may be formed with screw-threads around these parts for the attachment of the nozzle and the cap, or said parts may be cemented to the vessel. The outer wire guards in this case run from the base-plate to the top to protect the whole from accident.

I do not in this patent claim the combination of the glass body A with the guards $A'$ $A^2$, nor any feature not specifically claimed, it being my intention to limit this case to the precise inventions recited in the claims, reserving the right to claim all other patentable subject-matter in another application which I am about to file as a division of this case.

What I claim is—

1. The combination, with the conical top B, of the conical gauze guard D, substantially as set forth.

2. The combination, with body A, of the conical top B, conical gauze guard D, and the central cylindrical gauze guard, $D'$, substantially as set forth.

3. The combination, with the top of the can and the gauze guard D, of the spring $c\ c$, substantially as and for the purposes set forth.

4. The combination, with the body A and nozzle $B'$, of the gauze guard F and the gauze guard D, capable of rotation, substantially as set forth.

In testimony that I claim the foregoing as my own I affix my signature in presence of two witnesses.

STEPHEN S. NEWTON.

Witnesses:
A. W. DAVIS,
W. A. MONKMAN.